United States Patent
Abidi et al.

(10) Patent No.: US 9,276,953 B2
(45) Date of Patent: Mar. 1, 2016

(54) METHOD AND APPARATUS TO DETECT AND BLOCK UNAUTHORIZED MAC ADDRESS BY VIRTUAL MACHINE AWARE NETWORK SWITCHES

(71) Applicant: International Business Machines Corporation (IBM)

(72) Inventors: Vasmi Mohammad Abidi, Cupertino, CA (US); Marius-Cristian David, Dolj County (RO); Nirapad Ghosh, Sunnyvale, CA (US); Tamanna Zackaria Sait, San Jose, CA (US); Eugen-Cristian Udrea, Bucharest (RO)

(73) Assignee: International Business Machines Corporation, Armonk, NY (US)

(*) Notice: Subject to any disclaimer, the term of this patent is extended or adjusted under 35 U.S.C. 154(b) by 176 days.

(21) Appl. No.: 13/975,310

(22) Filed: Aug. 24, 2013

(65) Prior Publication Data

US 2014/0007232 A1    Jan. 2, 2014

Related U.S. Application Data

(63) Continuation-in-part of application No. 13/107,397, filed on May 13, 2011, now abandoned.

(51) Int. Cl.
*H04L 29/06* (2006.01)
*H04L 12/54* (2013.01)

(52) U.S. Cl.
CPC ........ *H04L 63/1441* (2013.01); *H04L 12/5696* (2013.01); *H04L 63/1466* (2013.01); *H04L 63/1483* (2013.01); *Y02B 60/43* (2013.01)

(58) Field of Classification Search
CPC ............ H04L 63/1441; H04L 63/0227; H04L 63/1466; H04L 63/1483
See application file for complete search history.

(56) References Cited

U.S. PATENT DOCUMENTS 5,394,402 A   2/1995   Ross
5,515,359 A   5/1996   Zheng
(Continued)

FOREIGN PATENT DOCUMENTS

CN   1897567 A   1/2007
CN   101030959 A   9/2007
(Continued)

OTHER PUBLICATIONS

Bates, et al., Deactivating Co-Residency With Active Traffic Analysis Techniques, CCSW, Oct. 19, 2012.
(Continued)

*Primary Examiner* — Omer S Mian
(74) *Attorney, Agent, or Firm* — Mark C. Vallone

(57) ABSTRACT

The disclosure relates to a method and apparatus for detecting and blocking unauthorized MAC addresses used by virtual machines. In one embodiment, the disclosure provides automated and consistent verification of VM traffic against values assigned to each VM by network administrator. In another embodiment, the disclosure provides for validating a newly discovered VM by comparing its attributes with the corresponding description of the known VMs stored at a database. A re-validation check may also be implemented. If the VM is validated, the VM will be processed according to network policy to support features including VMReady. If the VM fails validation, other actions can be taken.

12 Claims, 7 Drawing Sheets

(56) References Cited

U.S. PATENT DOCUMENTS

| | | |
|---|---|---|
| 5,617,421 A | 4/1997 | Chin et al. |
| 5,633,859 A | 5/1997 | Jain et al. |
| 5,633,861 A | 5/1997 | Hanson et al. |
| 5,742,604 A | 4/1998 | Edsall et al. |
| 5,893,320 A | 4/1999 | Demaree |
| 6,147,970 A | 11/2000 | Troxel |
| 6,304,901 B1 | 10/2001 | McCloghrie et al. |
| 6,347,337 B1 | 2/2002 | Shah et al. |
| 6,567,403 B1 | 5/2003 | Congdon et al. |
| 6,646,985 B1 | 11/2003 | Park et al. |
| 6,839,768 B2 | 1/2005 | Ma et al. |
| 6,901,452 B1 | 5/2005 | Bertagna |
| 7,035,220 B1 | 4/2006 | Simcoe |
| 7,263,060 B1 | 8/2007 | Garofalo et al. |
| 7,386,876 B2 | 6/2008 | Kim |
| 7,561,517 B2 | 7/2009 | Klinker et al. |
| 7,593,320 B1 | 9/2009 | Cohen et al. |
| 7,668,966 B2 | 2/2010 | Klinker et al. |
| 7,830,793 B2 | 11/2010 | Gai et al. |
| 7,839,777 B2 | 11/2010 | DeCusatis et al. |
| 7,848,226 B2 | 12/2010 | Morita |
| 7,912,003 B2 | 3/2011 | Radunovic et al. |
| 7,974,223 B2 | 7/2011 | Zelig et al. |
| 8,139,358 B2 | 3/2012 | Tambe |
| 8,194,534 B2 | 6/2012 | Pandey et al. |
| 8,213,429 B2 | 7/2012 | Wray et al. |
| 8,265,075 B2 | 9/2012 | Pandey |
| 8,271,680 B2 | 9/2012 | Salkewicz |
| 8,325,598 B2 | 12/2012 | Krzanowski |
| 8,345,697 B2 | 1/2013 | Kotha et al. |
| 8,406,128 B1 | 3/2013 | Brar et al. |
| 8,498,299 B2 | 7/2013 | Katz et al. |
| 2002/0191628 A1 | 12/2002 | Liu et al. |
| 2003/0105881 A1 | 6/2003 | Symons et al. |
| 2003/0185206 A1 | 10/2003 | Jayakrishnan |
| 2004/0088451 A1 | 5/2004 | Han |
| 2004/0243663 A1 | 12/2004 | Johanson et al. |
| 2004/0255288 A1 | 12/2004 | Hashimoto et al. |
| 2005/0047334 A1 | 3/2005 | Paul et al. |
| 2006/0029072 A1 | 2/2006 | Perera et al. |
| 2006/0251067 A1 | 11/2006 | DeSanti et al. |
| 2007/0263640 A1 | 11/2007 | Finn |
| 2008/0205377 A1 | 8/2008 | Chao et al. |
| 2008/0225712 A1 | 9/2008 | Lange |
| 2008/0228897 A1 | 9/2008 | Ko |
| 2009/0129385 A1 | 5/2009 | Wray et al. |
| 2009/0185571 A1 | 7/2009 | Tallet |
| 2009/0213869 A1 | 8/2009 | Rajendran et al. |
| 2009/0252038 A1 | 10/2009 | Cafiero et al. |
| 2010/0054129 A1 | 3/2010 | Kuik et al. |
| 2010/0054260 A1 | 3/2010 | Pandey et al. |
| 2010/0158024 A1 | 6/2010 | Sajassi et al. |
| 2010/0183011 A1 | 7/2010 | Chao |
| 2010/0223397 A1 | 9/2010 | Elzur |
| 2010/0226368 A1 | 9/2010 | Mack-Crane et al. |
| 2010/0246388 A1 | 9/2010 | Gupta et al. |
| 2010/0265824 A1 | 10/2010 | Chao et al. |
| 2010/0303075 A1 | 12/2010 | Tripathi et al. |
| 2011/0007746 A1 | 1/2011 | Mudigonda et al. |
| 2011/0019678 A1 | 1/2011 | Mehta et al. |
| 2011/0026403 A1 | 2/2011 | Shao et al. |
| 2011/0026527 A1 | 2/2011 | Shao et al. |
| 2011/0032944 A1 | 2/2011 | Elzur et al. |
| 2011/0035494 A1 | 2/2011 | Pandey et al. |
| 2011/0103389 A1 | 5/2011 | Kidambi et al. |
| 2011/0134793 A1 | 6/2011 | Elsen et al. |
| 2011/0235523 A1 | 9/2011 | Jha et al. |
| 2011/0238820 A1 | 9/2011 | Matsuoka |
| 2011/0274110 A1 | 11/2011 | Mmmadi et al. |
| 2011/0280572 A1 | 11/2011 | Vobbilisetty et al. |
| 2011/0299406 A1 | 12/2011 | Vobbilisetty et al. |
| 2011/0299409 A1 | 12/2011 | Vobbilisetty et al. |
| 2011/0299532 A1 | 12/2011 | Yu et al. |
| 2011/0299536 A1 | 12/2011 | Cheng et al. |
| 2012/0014261 A1 | 1/2012 | Salam et al. |
| 2012/0014387 A1 | 1/2012 | Dunbar et al. |
| 2012/0177045 A1 | 7/2012 | Berman |
| 2012/0228780 A1 | 9/2012 | Kim et al. |
| 2012/0243539 A1 | 9/2012 | Keesara |
| 2012/0243544 A1 | 9/2012 | Keesara |
| 2012/0287786 A1 | 11/2012 | Kamble et al. |
| 2012/0287787 A1 | 11/2012 | Kamble et al. |
| 2012/0287931 A1 | 11/2012 | Kidambi et al. |
| 2012/0287939 A1 | 11/2012 | Leu et al. |
| 2012/0291028 A1 | 11/2012 | Kidambi et al. |
| 2012/0320749 A1 | 12/2012 | Kamble et al. |
| 2013/0022050 A1 | 1/2013 | Leu et al. |
| 2013/0051235 A1 | 2/2013 | Song et al. |
| 2013/0064067 A1 | 3/2013 | Kamath et al. |
| 2013/0064068 A1 | 3/2013 | Kamath et al. |

FOREIGN PATENT DOCUMENTS

| | | |
|---|---|---|
| CN | 101087238 A | 12/2007 |
| CN | 101809943 A | 8/2010 |
| CN | 101986666 A | 3/2011 |
| EP | 0853405 A | 7/1998 |
| EP | 002009862 A1 | 12/2008 |
| JP | 02006148255 A1 | 6/2006 |
| JP | 2007180796 A | 7/2007 |
| JP | 02012080217 A1 | 4/2012 |
| WO | 2010096155 A1 | 8/2010 |

OTHER PUBLICATIONS

VMware, Inc., "VMware Virtual Networking Concepts", Latest Revision: Jul 29, 2007, 12 pages.

Perla, "Profiling User Activities on Guest OSes in a Virtual Machine Environment." (2008), 94 pages.

Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).

Guha et al., ShutUp: End-to-End Containment of Unwanted Traffic, pp. 1-14, (2008).

Recio et al., Automated Ethernet Virtual Bridging, pp. 1-11, IBM 2009.

Sproull et al., "Control and Configuration Software for a Reconfigurable Networking Hardware Platform", Applied Research Laboratory, Washington University, Saint Louis, MO 63130; Issue Date: 2002, Date of Current Version: Jan. 6, 2003, 10 pages.

Papadopoulos et al.,"NPACI Rocks: Tools and Techniques for Easily Deploying Manageable Linux Clusters", The San Diego Supercomputer Center, University of California San Diego, La Jolla, CA 92093-0505—Issue Date: 2001, Date of Current Version: Aug. 7, 2002, 20 pages.

Ruth et al., Virtual Distributed Environments in a Shared Infrastructure, pp. 63-69, IEEE Computer Society, May 2005.

Rouiller, Virtual LAN Security: weaknesses and countermeasures, pp. 1-49, GIAC Security Essentials Practical Assignment Version 1.4b.

Walters et al., An Adaptive Heterogeneous Software DSM, pp. 1-8, Columbus, Ohio, Aug. 14-Aug. 18.

Skyrme et al., Exploring Lua for Concurrent Programming, Journal of Universal Computer Science, vol. 14, No. 21 (2008), submitted: Apr. 16, 2008, accepted: Jun. 5, 2008, appeared: Dec. 1, 2008, 12 pages.

Dobre, Multi-Architecture Operating Systems, Oct. 4, 2004, 82 pages.

Int'l Searching Authority; Int. Appln. PCT/182012/051803; Int'l Search Report dated Sep. 13, 2012, 8 pages.

U.S. Appl. No. 13/107,893, Notice of Allowance Dated Jul. 10, 2013, 21 pages.

U.S. Appl. No. 13/107,893, Non-Final Office Action Dated Apr. 1, 2013, 33 pages.

U.S. Appl. No. 13/472,964, Notice of Allowance Dated Jul. 16, 2013, 19 pages.

U.S. Appl. No. 13/472,964, Non-Final Office Action Dated Mar. 29, 2013, 21 pages.

(56) References Cited

OTHER PUBLICATIONS

U.S. Appl. No. 13/107,903, Notice of Allowance Dated Sep. 11, 2013, 30 pages.
U.S. Appl. No. 13/107,903, Final Office Action Dated Jul. 19, 2013, 21 pages.
U.S. Appl. No. 13/107,903, Non-Final Office Action Dated Feb. 22, 2013, 25 pages.
U.S. Appl. No. 13/585,446, Notice of Allowance Dated Sep. 12, 2013, 17 pages.
U.S. Appl. No. 13/585,446, Final Office Action Dated Jul. 19, 2013, 19 pages.
U.S. Appl. No. 13/585,446, Non-Final Office Action Dated Feb. 16, 2013, 36 pages.
U.S. Appl. No. 13/107,397, Final Office Action Dated May 29, 2013, 11 pages.
U.S. Appl. No. 13/107,397, Non-Final Office Action Dated Jan. 4, 2013, 16 pages.
U.S. Appl. No. 13/466,754, Non-Final Office Action Dated Sep. 25, 2013, 15 pages.
U.S. Appl. No. 13/107,894, Non-Final Office Action Dated Jun. 20, 2013, 29 pages.
U.S. Appl. No. 13/594,970, Final Office Action Dated Sep. 25, 2013, 13 pages.
U.S. Appl. No. 13/594,970, Non-Final Office Action Dated May 29, 2013, 23 pages.
U.S. Appl. No. 13/107,397, Final Office Action Dated May 29, 2013, 10 pages.
U.S. Appl. No. 13/107,397, Non-Final Office Action Dated Jan. 4, 2013, 9 pages.
U.S. Appl. No. 13/466,754, Non-Final Office Action Dated Sep. 25, 2013, 10 pages.
U.S. Appl. No. 13/229,867, Non-Final Office Action Dated May 24, 2013, 30 pages.
U.S. Appl. No. 13/595,047, Non-Final Office Action Dated May 24, 2013, 18 pages.
U.S. Appl. No. 13/107,985, Notice of Allowance Dated Jul. 18, 2013, 14 pages.
U.S. Appl. No. 13/107,985, Non-Final Office Action Dated Feb. 28, 2013, 18 pages.
U.S. Appl. No. 13/107,433, Final Office Action Dated Jul. 10, 2013, 18 pages.
U.S. Appl. No. 13/107,433, Non-Final Office Action Dated Jan. 28, 2013, 23 pages.
U.S. Appl. No. 13/466,790, Final Office Action Dated Jul. 12, 2013, 19 pages.
U.S. Appl. No. 13/466,790, Non-Final Office Action Dated Feb. 15, 2013, 18 pages.
U.S. Appl. No. 13/107,554, Final Office Action Dated Jul. 3, 2013, 9 pages.
U.S. Appl. No. 13/107,554, Non-Final Office Action Dated Jan. 8, 2013, 19 pages.
U.S. Appl. No. 13/229,891, Non-Final Office Action Dated May 9, 2013, 17 pages.
U.S. Appl. No. 13/595,405, Non-Final Office Action Dated May 9, 2013, 16 pages.
U.S. Appl. No. 13/107,896, Notice of Allowance Dated Jul. 29, 2013, 18 pages.
U.S. Appl. No. 13/107,896, Non-Final Office Action Dated Mar. 7, 2013, 17 pages.
U.S. Appl. No. 13/267,459, Non-Final Office Action Dated May 2, 2013, 17 pages.
U.S. Appl. No. 13/267,578, Non-Final Office Action Dated Aug. 6, 2013, 19 pages.
U.S. Appl. No. 13/267,578, Non-Final Office Action Dated Apr. 5, 2013, 18 pages.
U.S. Appl. No. 13/314,455, Final Office Action Dated Aug. 30, 2013, 19 pages.
U.S. Appl. No. 13/314,455, Non-Final Office Action Dated Apr. 24, 2013, 19 pages.

Martin, et al., "Accuracy and Dynamics of Multi-Stage Load Balancing for Multipath Internet Routing", Institute of Computer Science, Univ. of Wurzburg Am Hubland, Germany, IEEE Int'l Conference on Communications (ICC) Glasgow, UK, pp. 1-8, Jun. 2007.
Kinds, et al., "Advanced Network Monitoring Brings Life to the Awareness Plane", IBM Research Spyros Denazis, Univ. of Patras Benoit Claise, Cisco Systems, IEEE Communications Magazine, pp. 1-7, Oct. 2008.
Kandula, et al., "Dynamic Load Balancing Without Packet Reordering", ACM SIGCOMM Computer Communication Review, vol. 37, No. 2, pp. 53-62, Apr. 2007.
Vazhkudai, et al., "Enabling the Co-Allocation of Grid Data Transfers", Department of Computer and Information Sciences, The Univ. of Mississippi, pp. 44-51, Nov. 17, 2003.
Xiao, et al. "Internet QoS: A Big Picture", Michigan State University, IEEE Network, pp. 8-18, Mar./Apr. 1999.
Jo et al., "Internet Traffic Load Balancing using Dynamic Hashing with Flow Volume", Conference Title: Internet Performance and Control of Network Systems III, Boston, MA pp. 1-12, Jul. 30, 2002.
Schueler et al., "TCP-Splitter: A TCP/IP Flow Monitor in Reconfigurable Hardware", Appl. Res. Lab., Washington Univ. pp. 54-59, Feb. 19, 2003.
Yemini et al., "Towards Programmable Networks"; Dept. of Computer Science Columbia University, pp. 1-11, Apr. 15, 1996.
Soule, et al., "Traffic Matrices: Balancing Measurements, Interference and Modeling", vol. 33, Issue: 1, Publisher: ACM, pp. 362-373, Year 2005.
De-Leon, "Flow Control for Gigabit", Digital Equipment Corporation (Digital), IEEE 802.3z Task Force, Jul. 9, 1996, pp. 1-31.
Schlansker, et al., "High-Performance Ethernet-Based Communications for Future Multi-Core Processors", Proceedings of the 2007 ACM/IEEE conference on Supercomputing, Nov. 10-16, 2007, 12 pages.
Yoshigoe, et al., "Rate Control for Bandwidth Allocated Services in IEEE 802.3 Ethernet", Proceedings of the 26th Annual IEEE Conference on Local Computer Networks, Nov. 14-16, 2001, pp. 446-453.
Tolmie, "HIPPI-6400—Designing for speed", 12th Annual Int'l Symposium on High Performance Computing Systems and Applications (HPCSt98), May 20-22, 1998, 25 pages.
Manral, et al., "Rbridges: Bidirectional Forwarding Detection (BFD) support for TRILL draft-manral-trill-bfd-encaps-01", pp. 1-10, TRILL Working Group INTERNET-DRAFT, Mar. 13, 2011.
Perlman, et al., "Rbridges: Base Protocol Specification", pp. 1-117, TRILL Working Group INTERNET-DRAFT, Mar. 3, 2010.
D.E. Eastlake, "Rbridges and the IETF TRILL Protocol", pp. 1-39, TRILL Protocol, Dec. 2009.
Leu, Dar-Ren, "dLAG-DMLT over TRILL", Blade Network Technologies, pp. 1-20, Copyright 2009.
Posted by Mike Fratto, "Cisco's FabricPath and IETF TRILL: Cisco Can't Have Standards Both Ways", Dec. 17, 2010; http://www.networkcomputing.com/data-networking-management/229500205, 2 pages.
Cisco Systems Inc., "Cisco FabricPath Overview", pp. 1-20, Copyright 2009.
Brocade, "BCEFE in a Nutshell First Edition", Global Education Services Rev. 0111, pp. 1-70, Copyright 2011, Brocade Communications Systems, Inc.
Pettit et al., Virtual Switching in an Era of Advanced Edges, pp. 1-7, Nicira Networks, Palo Alto, California. Version date Jul. 2010.
Pfaff et al., Extending Networking into the Virtualization Layer, pp. 1-6, Oct. 2009, Proceedings of the 8th ACM Workshop on Hot Topics in Networks (HotNets-VIII), New York City, New York,.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, NSDI'07 Proceedings of the 4th USENIX conference on Networked systems design & implementation USENIX Association Berkeley, CA, USA 2007, 14 pages.
Hunter et al., BladeCenter Networking, IBM Journal of Research and Development, vol. 49, No. 6, pp. 905-919, Nov. 2005.

METHOD AND APPARATUS TO DETECT AND BLOCK UNAUTHORIZED MAC ADDRESS BY VIRTUAL MACHINE AWARE NETWORK SWITCHES

BACKGROUND

1. Field of the Invention

The disclosure relates to preventing MAC spoofing. Specifically, the disclosure relates to novel method and apparatus for identifying and validating newly discovered virtual machines ("VMs").

2. Description of Related Art

The term utility computing has been used to refer to a computational model in which processing, storage and network resources, software, and data are accessible to client computer systems and other client devices (e.g., mobile phones or media players) on demand, much like familiar residential utility services, such as water and electricity. In some implementations, the specific computational resources (e.g., servers, storage drives, etc.) allocated for access and use by client devices are specified by service agreements between the utility computing provider and its customers. In other implementations, commonly referred to as cloud computing, details of the underlying information technology (IT) infrastructure are transparent to the utility computing customers.

Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level, agreements (SLAs). In a typical cloud implementation, cloud consumers consume computational resources as a service and pay only for the resources used.

Adoption of utility computing has been facilitated by the widespread utilization of virtualization, which is the creation of virtual (rather than actual) versions of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, AIX, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly associated with multiple different utility computing customers.

The visualization of actual IT resources and management of VMs is typically provided by software referred to as a VM monitor (VMM) or hypervisor. In various implementations, a VMM may run on bare hardware (Type 1 or native VMM) or on top of an operating system (Type 2 or hosted VMM).

In a typical virtualized computing environment, VMs can communicate with each other and with physical entities in the IT infrastructure of the utility computing environment utilizing conventional networking protocols. Conventional networking protocols are commonly premised on the seven layer Open Systems Interconnection (OSI) model, which includes: physical, data link, network, transport, session, presentation, and application layers. VMs communicate with other network entities as if each VM is a physical network element. This is done by substituting a virtual network connection for the conventional physical layer connection.

Conventional switches also have the so-called VMReady feature which automatically discovers VMs connected to a particular switch port. VMReady configures the switch ports for the discovered VM, providing significant value to the network administrator by simplifying and automating switch, configuration and by moving network policies on VM migration. VMReady identifies VMSs by their MAC address. An untrusted server or VM could identify itself by a trusted or known MAC address, leading to MAC spoofing attacks. For example, MAC addresses can be reused or duplicated for a different VM. Such reuse or duplication create security concern.

Therefore, there is a need for a method and system for detecting, identifying and validating MAC addresses assigned to newly-discovered VMs.

SUMMARY

The disclosure provides automated and consistent verification of VM traffic against values assigned to each VM by network administrator. Specifically, an embodiment of the disclosure provides for validating a newly-discovered VM by comparing its attributes with the corresponding description of the VM stored at a database. If the VM is validated, the VM will be processed according to network policy to support, features including VMReady. If the VM fails validation, other actions can be taken. A pre-validation process can be added according to one embodiment of the disclosure. Here, once the validation requirement is triggered the static configuration of the relevant switch is queried to determine whether the port on which the VM resides is identified at the static configuration of the switch. If the relevant port is identified, additional validation may be avoided. The pre-validation process can be used as a stand-alone process or may be combined one or more of the disclosed validation techniques.

In one embodiment, the disclosure provides a method and protocol for using information about physical connectivity of a server and a switch, together with VM attributes assigned by a VM manager and information in the incoming VM traffic to validate VM identity.

In another embodiment, the disclosure relates to a method for verifying identity of VMs, the method comprising: receiving an initial message at a first VM from an associated switch, the initial message relayed through a second VM, the first VM managed by a first hypervisor; retrieving data relating to the initial message from a database; querying the data to determine whether the initial message arrived through a port communicating with the first hypervisor; verifying identity of the first VM if the initial message is routed through the port communicating with the first hypervisor; and validating the first VM address by querying the data to ascertain an attribution match on at least one of first VM MAC Address, VM UUID, switch port address or switch ID.

In still, another embodiment, a system for verifying identity of a VM comprises: a processor circuit; a memory circuit in communication with the processor circuit, the memory circuit storing a program code executable on the processor circuit, the program code configuring the processor circuit to:

(i) receive an initial message at a first VM from an associated switch, the initial message relayed through a second VM, the first VM managed by a first hypervisor; (ii) retrieve data relating to the initial message from a database; (iii) query the data to determine whether the initial message arrived through a port in communication with the first hypervisor; (iv) verify identity of the first VM if the initial message is routed through the port communicating with the first hypervisor; and (iv) validate the first VM address by querying the data to ascertain an attribution match on at least one of first VM MAC Address, VM UUID, switch port address or switch ID.

In yet another embodiment, the disclosure relates to a non-transitory computer-readable medium comprising instructions configured to cause a computer to: receive an initial message at a first VM from an associated switch, the initial message relayed through a second VM, the first VM managed by a first hypervisor; retrieve data relating to the initial message from a database; query the data to determine whether the initial message arrived through a trusted port in communication with the first hypervisor; verify identity of the first VM if the initial message is routed through the trusted port in communication with the first hypervisor; and validate the first VM address by querying the data to ascertain an attribution match on at least one of first VM MAC Address, VM UUID, switch port address or switch ID.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
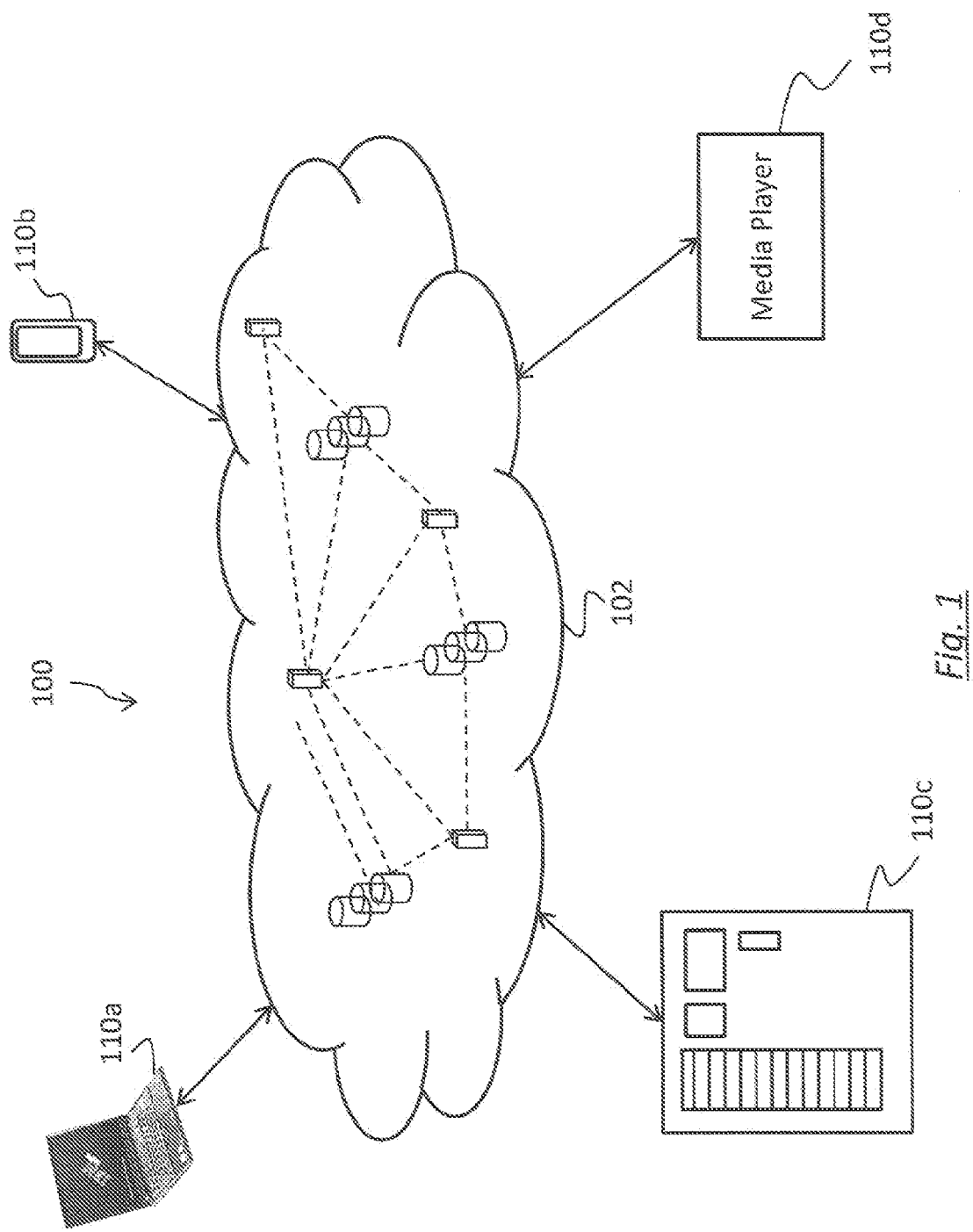
FIG. 1 is a schematic diagram of a data processing environment according to an embodiment of the disclosure.

Software of a known physical network switch has stored a medium access control (MAC) address as a virtual machine (VM) identifier in configuration and data structures of the physical network switch to facilitate securing an associated virtualized computing environment. Dependence on the MAC addresses as VM identifier have several limitations. For example, using MAC addresses as VM identifiers may allow a user of an end station (i.e., a physical machine) that has root privileges to spoof a source MAC address and gain unauthorized access to a virtual local area network (VLAN). Another limitation is that a MAC address may be assigned to another VM or end station; thereby creating several VMs with, the same MAC address. Yet another limitation of using MAC addresses as VM identifiers is that an original VM may be destroyed and a MAC address of the original VM may be redistributed to a new VM. In short, MAC addresses may be intentionally (e.g., unauthorized access, spoofing) or unintentionally (e.g., reassignment) duplicated thereby nullifying uniqueness to the desired VM.

Among others, Applicant's disclosure provides different validation techniques for identifying MAC address duplication or reassignment. By way of example, a first validation mode may be implemented that performs a basic check to guard against MAC address spoofing. As another example, a second validation mode may be implemented to perform a more elaborate check that addresses spoofing, duplication, and reassignment of MAC addresses. The first validation mode may be simpler and taster Than the second validation mode. The first validation mode can be deployed in environments where it is known, that MAC address reassignment and duplication does not occur. While the examples of the disclosure are directed to VM controlled by hypervisors, it should be appreciated that the techniques may be extended to other virtualization modes that provide secure application programming interfaces (APIs) to facilitate VM management and control.

The exemplary first and second validation modes may employ periodic discovery messages. The discovery messages can provide a switch identifier (e.g., LP address) and switch port number to a server port. Discovery messages (interchangeably, hello messages) may not be generated by arbitrary systems on a network as, by standard, discovery messages cannot be forwarded by a physical network switch from one port to another port. As such, a discovery message received by a VMM is guaranteed to have originated from a directly connected physical network switch.

Thus according to one embodiment of the disclosure, a physical network switch periodically transmits a discovery message on each server port (e.g., internal ports on bladed switches and specially marked server ports on top-of-rack (ToR) switches). A physical network switch may transmit discovery messages compliant with a Cisco discovery protocol (CDP) or a link layer discovery protocol (LLDP).

The server software (e.g., VMware™, ESX™) listens for discovery messages on all physical network interface cards (NICs). Once received, the discovery message data for each physical NIC is recorded on a database. The stored discovery message data can be retrieved (e.g., using a VMware™ virtual infrastructure (VI API)) by a physical network switch or other devices. The combination of discovery message advertisements on server ports and retrieval of selected port assignment data (by a physical network switch) using a secure API enables port identification used by VMM servers. Additional validation, for example, Cross-checking a VM MAC address (or other information) to physical network switch port mapping, can be implemented as supplemental validation mode.

In the first validation mode, configuration of physical network switch software is allowed only on VMM (e.g., ESX™) ports. By disallowing spoofing at the VMM (i.e., VMs are allowed to use only MAC addresses assigned to them by the VMM), VMM ports may be assumed to be spoof-proof. VMM ports may additionally be identified by transmitting discovery messages from a physical network switch on server ports and using a secure API (e.g., the VI API) to scan through the discovery message data stored against each physical NIC in an inventory hierarchy (e.g., the VMware™, vCenter™ inventory hierarchy). A given physical network switch port is deemed to be a VMM port if the switch port can be located in the scan. That is, when some physical port in the VMM inventory has a same switch identifier and switch port identifier as a switch port in question, the switch port is deemed to be a VMM port.

VMM port marking/validation may require invocation in a number of different scenarios in which a physical network switch port has not yet been marked as a VMM port. For example, when a VM interface is added to a VM group and a MAC address of the VM is already in a level 2 (L2) table of a physical network switch, i.e., the MAC address is already 'active' on a switch port, VMM port marking/validation requires invocation. Alternatively, when a VM interface is already in a VM group of a physical network switch and a MAC address of the VM Interface experiences a 'source miss' on a port of the network switch (commonly referred to as pre-provisioning), VMM port marking/validation requires invocation.

Another consideration is a link-up event on a port. If a port that is marked as a VMM port goes down, a VMM port attribute for the port should be cleared in the event that the port is subsequently connected to an end station that is not managed by the VMM. Here, when the link comes back up, VMM port validation should be initiated. Link validation may be performed according to the source-miss scenario or by proactively checking to determine if the VMM port remains intact before VMs begin transmitting traffic on the VMM port. Validation for the source-miss scenario may be performed in-band, since the source-miss is triggered by the first arriving packet from the VM.

Functionality may be affected if, during validation, subsequent packets from a VM are discarded. However, since the first packets arriving from a VM at a physical network switch port are typically proxied by the VMM (i.e., ESX™ sends a reverse address resolution protocol (RARP) packet with a MAC address of a VM as a source address) and real packets from the VM arrive much later in time. In most cases validation completes (success or failure) ahead of the first non-proxied packet's arrival from the VM. In general, a time between the first proxied packet and the first actual packet from the VM is typically longer during VM startup than during live VM migration (e.g., VMware™ VMotion™). In the event that real packets from the VM get dropped during validation, the discards are not expected to affect functionality with most upper level protocols (e.g., transfer control protocol (TCP)). While a slight performance degradation may occur due to dropped packets, discards are not unexpected during live migration.

In the second (advanced) validation mode, software configuration at a physical network switch for a given VM interface may be applied after verifying the connectivity of the given VM interface. The VM MAC address is stored along with the universal unique identifier (UUID) of the VM to ensure unambiguous identification of VM interface. When a physical network switch starts receiving packets from a VM that is in a VM group of the network switch, the switch checks to determine if the VM interface specified by the user (i.e., in the configuration of the switch) is the VM interface that is transmitting on the switch port where the packets are being received. The second validation mode may use similar techniques as the first validation mode. That is, discovery messages are used along with secure API port assignment data retrieval (e.g., from a VMware™ Virtual Center™ Inventory). A difference between the first and second validation modes is the level of validation. Instead of just checking if some physical interface in the VMware™ Virtual Center™ inventory is connected to the switch port as in the first validation mode, the second validation mode may check additional parameters (i.e., VM MAC address, VM UUID, switch port, and switch ID) between the network switch and the VMM inventory for consistency.

At the network switch, the MAC address and UUID of the VM, as well as the switch ID, are stored in a current configuration file, while the port number comes from the L2 table of the switch when the VM is active. The VI API client (i.e., the physical network switch) locates the VM interface in the VMware™ Virtual Center™ inventory based on the UUID and MAC address of the VM. The VI API client then reads the port assignment data of the corresponding physical NIC (by mapping a port group of the VM interface to its virtual switch, then to the physical NIC/NICs that act as uplinks for the virtual switch). The port assignment data provides the switch ID and port number, based on received discovery message data. In one or more embodiments, the MAC address appearing on the switch port is deemed verified only if the four parameters match exactly. This check guards against spoofing MAC addresses, duplicate MAC addresses, and reused MAC addresses.

In one or more embodiments, software executing on a physical network switch invokes a send routine periodically (e.g., every minute) to transmit a discovery message. The send routine transitions through a list of configured ports to determine which ports require transmission of advertisements with discovery message data. It should be noted, that all internal ports and server ports are by default configured to send out advertisements and when some ports are removed, the removed ports do not get saved in the configuration and, as such, do not survive 'reset'. As used herein, the term 'internal ports' refer to embedded physical network switches (which reside inside a blade server and have fixed server and non-server ports) and the term 'server ports' refer to non-embedded physical network switches (which have ports that can connect to server and other physical network switches and, as such, require explicit designation of server ports). In one or more embodiments, when a link comes up on a port which is configured to send out discovery messages, a discovery message is immediately transmitted. In various embodiments, UUIDs of configured VMs are saved in a configuration file to facilitate strict checking. A global array may be maintained at the network switch to hold port settings. In one or more embodiments, two copies of the global array (i.e., a first copy to hold settings when the configuration is not applied and a second copy that corresponds to a current configuration) are maintained. In various embodiments, each VM belonging to a VM group is tracked to determine when a MAC address of the VM requires verification.

FIG. 1 is a high level block diagram of a data processing environment according to an embodiment of the disclosure. In FIG. 1, data processing environment 100, includes a collection of computing resources commonly referred to as a cloud 102. Computing resources within cloud 102 are interconnected for communication and may be grouped (not shown) physically or virtually in one or more networks. Data processing environment 100 can offer infrastructure, platforms and/or software as services accessible to client devices 110, including computer 110a, smart phones 110b, server computer systems 110c and media players or other devices 110d.

Figure 2:
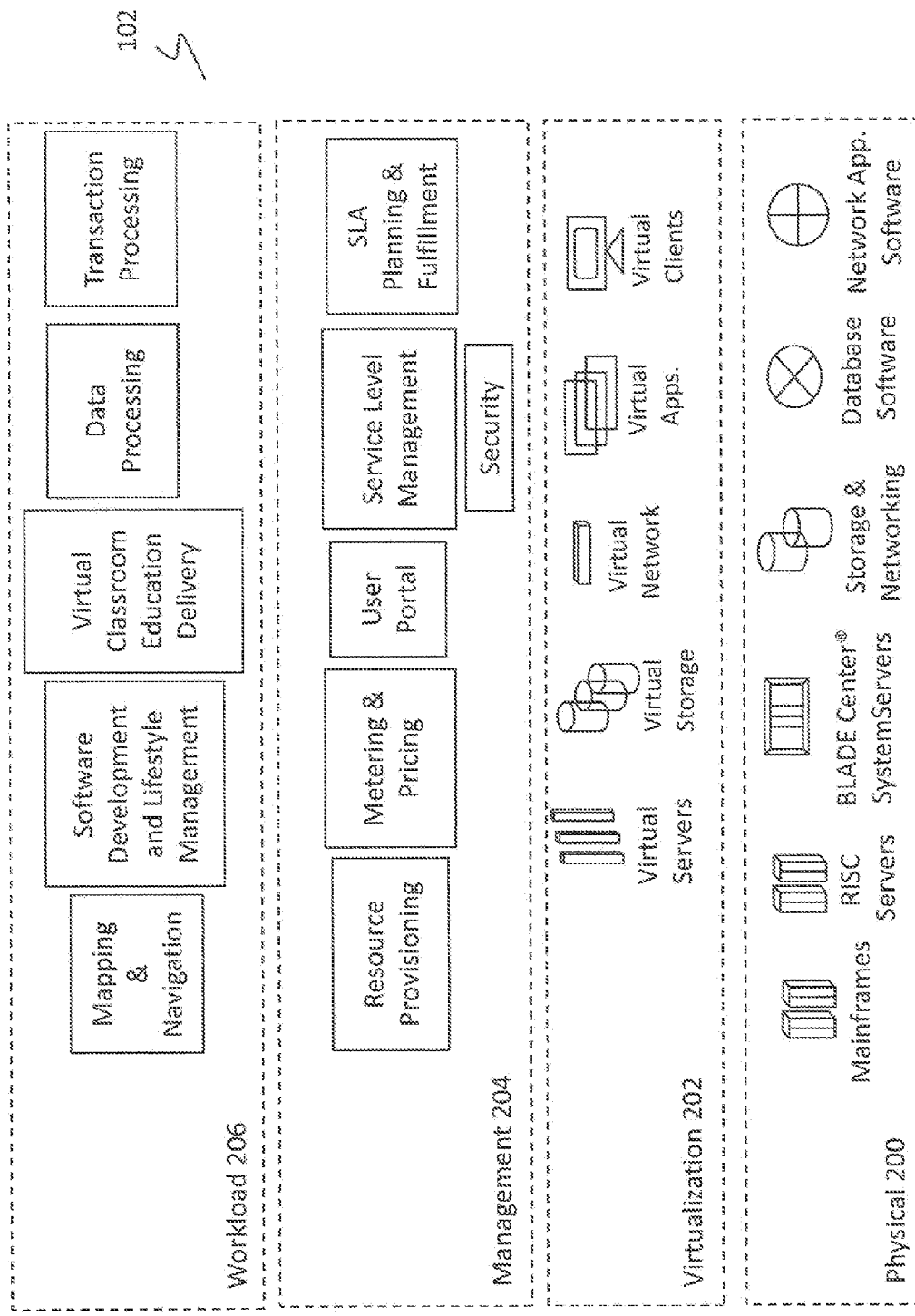
FIG. 2 depicts layering of virtual and physical resources in the exemplary data processing environment of FIG. 1.

FIG. 2 depicts layering of virtual and physical resources in the exemplary data processing environment of FIG. 1. In FIG. 2, cloud 102 includes a physical layer 200, a visualization layer 202, a management layer 264, and a workloads layer 206. Physical layer 200 further includes various physical hardware and software components that can be used to instantiate virtual entities for use by the cloud service provider and its customers. Exemplary hardware components include mainframes (e.g., IBM® zSeries® systems), reduced instruction set computer (RISC) architecture servers (e.g., IBM pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include operating system software (e.g., AIX, Windows, Linux, etc.), network application server software (e.g., IBM WebSphere® application server software, which includes web server software), and database software (e.g., IBM DB2®, database software). IBM, zSeries, pSeries, xSeries, BladeCenter, WebSphere, and DB2 are trademarks of International Business Machines Corporation registered in many jurisdictions worldwide.

The computing resources residing in physical layer 200 of cloud 102 are virtualized and managed by one or more VMMs or hypervisors. The VMMs present a virtualization layer 202 including virtual entities (e.g., virtual servers, virtual, storage, virtual, networks (including virtual private networks)), virtual applications, and virtual clients. The virtual entities, which are abstractions of the underlying resources in physical layer 200, may be accessed by client devices 110 of cloud consumers on-demand.

The VMM(s) also support a management layer 204 which implements various management functions for the cloud 102. The management functions can be directly implemented by the VMM(s) and/or one or more management or service VMs running on the VMM(s) and may provide functions such as resource provisioning, metering and pricing, security, user portal services, service level, management, security, SLA planning and fulfillment. The resource provisioning function provides dynamic procurement of computing resources and other resources that are utilized to perform tasks within the cloud computing environment. The metering and pricing function provides cost tracking and billing or invoicing for consumption of the utilized resources. The utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. The SLA planning and fulfillment function provides and procures anticipated cloud computing resources.

Workloads layer 206, may be implemented by one or more consumer VMs. Workload layer 206 provides examples of functionality for which the cloud computing environment may be utilized. Such examples include: mapping and navigation; software development and lifecycle management; virtual classroom education delivery; data analytics processing; and transaction processing.

Figure 3:
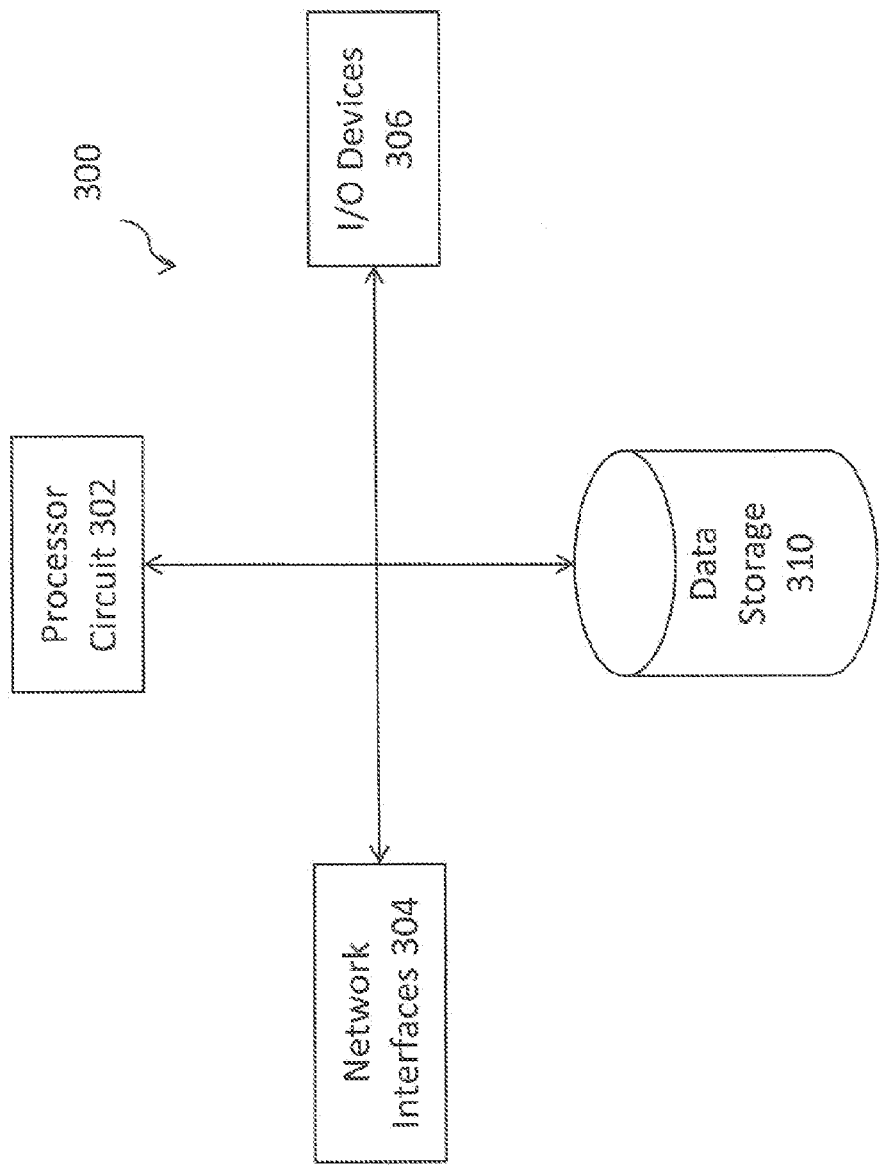
FIG. 3 is a high level block diagram of a data processing system in accordance with an embodiment of the disclosure.

FIG. 3 is a high level block diagram of a data processing system in accordance with one embodiment. Data processing system 300 of FIG. 3 can be utilized to implement a physical host computing platform in physical layer 200 of FIG. 2 or a client device 110 of FIG. 1. In FIG. 3, data processing system 300 includes one or more network interfaces 304 that permit data processing system 300 to communicate with one or more computing resources in cloud 102 via cabling and/or one or more wired or wireless, public or private, local or wide area networks (including the Internet). Data processing system 300 includes one or more processors 302 that process data and program code, for example, to manage, access and manipulate data or software in data processing environment 100. Data processing system 300 also includes input/output (I/O) devices 306, such as ports, displays, and attached devices, etc. Finally, data processing system 300 includes data storage 310, which may include one or more volatile and/or non-volatile storage devices. Data storage 310 may store software within physical layer 200 and/or software, such as a web browser, that facilitates access to workloads layer 206 and/or management layer 204.

Figure 4:
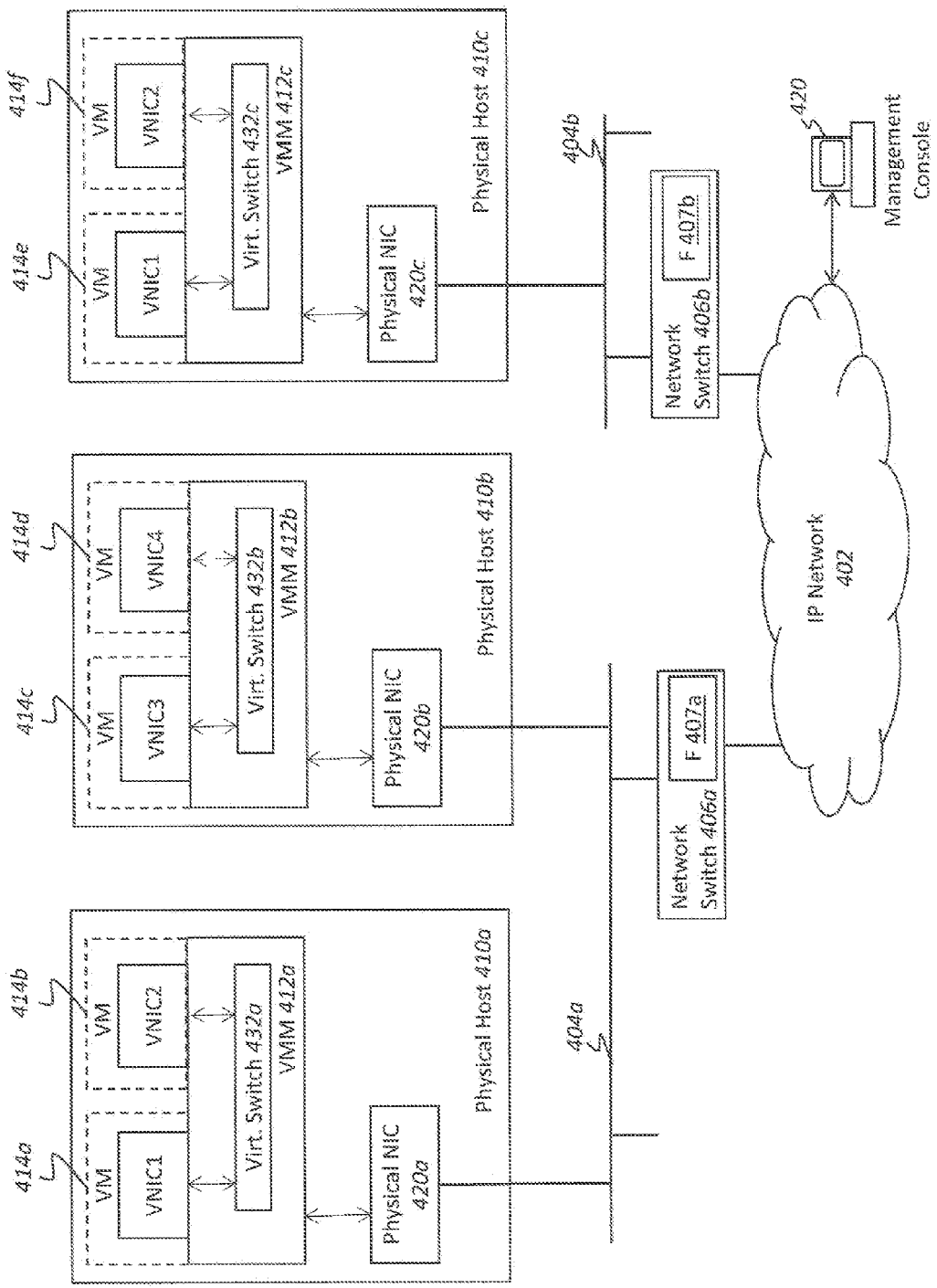
FIG. 4 schematically illustrates a block diagram of a data processing environment for implementing network security at a physical network switch in accordance with an embodiment of the disclosure.

FIG. 4 schematically illustrates a high level block diagram of a data processing environment that implements network security at a physical network switch in accordance with one embodiment. Data processing environment 400 of FIG. 4 applies virtual networking techniques disclosed herein and can be implemented on cloud 102 of FIG. 1. Data processing environment 400 includes an IP network 402 including network segments 404 $a$, 404 $b$, each of which is coupled to a respective one of physical network switches 406 $a$, 406 $b$. Each of physical network switches 406 $a$, 406 $b$ includes a respective data structure (e.g., a respective forwarding table (F)) 407 $a$, 407 $b$ by which physical network switches 406 $a$, 406 $b$ forward incoming data packets toward the packets' destinations based upon, for example, OSI Layer 2 (e.g., MAC) addresses contained in the packets. Physical hosts 410 $a$, 410 $b$ are coupled to network segment 404 $a$ and physical host 410 $c$ is coupled to network segment 404 $b$. Each of physical hosts 410 $a$-410 $c$ can be implemented, for example, utilizing a data processing system 300 as depicted in FIG. 3.

Each physical hosts 410 $a$-410 $c$ executes a respective one of VMM 412 $a$-412 $c$, which virtualizes and manages the resources of its respective physical host 410 under direction of a human and/or automated cloud administrator at a VMM management console 420 (which can be implemented using data processing system 300 as depicted in FIG. 3) coupled to physical hosts 410 $a$-410 $c$ by IP network 402. VMM 412 $a$ on physical host 410 $a$ supports the execution of VMs 414 $a$, 414 $b$, VMM 412 $b$ on physical host 410 $b$ supports the execution, of VMs 414 $c$, 414 $d$, and VMM 412 $c$ on physical host 410 $c$ supports the execution of VMs 414 $e$, 414 $f$. As one example, management console 420 may be configured, to execute VMware™ vCenter Server™ to manage VMMs 412 $a$-412 $c$. More or less than two VMs may be deployed on a physical host configured according to the present disclosure. In various embodiments, VMs 414 $a$-414 $f$ can include VMs of one or more cloud consumers and/or a cloud provider. In the depicted embodiment, each of VMs 414 has one (and may include multiple) virtual network interface controller VNIC1-VNIC6, which, provide network connectivity at least at Layers 2 and 3 of the OSI model.

Virtual switch 432 $a$ is configured to forward at least some communications from/to VNIC1 and VNIC2 of VMs 414 $a$, 414 $b$, respectively, to physical network switch 406 $a$ (over network segment 404 $a$) using physical NIC 420 $a$. Virtual switch 432 $b$ is configured to forward at least some communications from/to VNIC3 and VNIC4 of VMs 414 $c$, 414 $d$, respectively, to physical network switch 406 $a$ (over network segment 404 $a$) using physical NIC 420 $b$. Similarly, virtual switch 432 $c$ is configured to forward at least some communications from/to VNIC5 and VNIC6 of VMs 414 $e$, 414 $f$, respectively, to physical network switch 406 $b$ (over network segment 404 $b$) using physical NIC 420 $c$. In various embodiments, physical switches. 406 $a$, 406 $b$ are configured to communicate (e.g., via a secure API) with management console 420 to retrieve port assignment data to validate port assignments for VMs 414 $a$-414 $f$. In one or more embodiments, management console 420 may maintain the port assignment data for VMs 414 $a$-414 $f$ or may facilitate access to port assignment data for VMs 414 $a$-414 $f$, respectively, that is maintained by VMMs 412 $a$-412 $c$.

Figure 5:
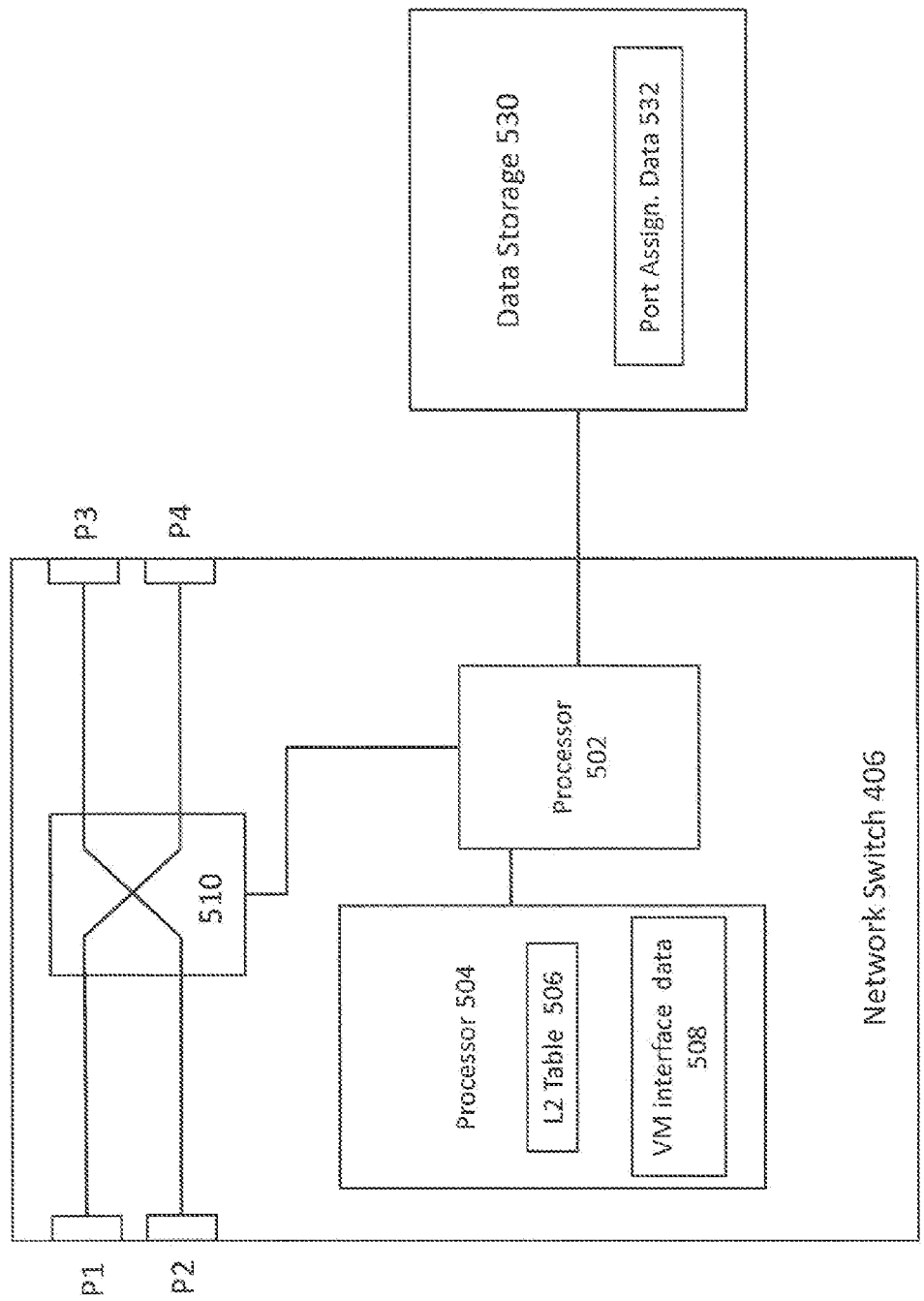
FIG. 5 schematically illustrates a block diagram of the relevant portions of a physical network switch configured in accordance with an embodiment of the disclosure.

FIG. 5 schematically illustrates a block diagram of the relevant portions of a physical network switch configured in accordance with one embodiment. Specifically, FIG. 5 depicts relevant portions of physical network switch 406 in data processing environment 406 (FIG. 4) according to one embodiment of the disclosure. Physical network switch 406 includes four ports (labeled P1-P4), a crossbar switch 510, a processor 502, and a data storage (e.g., a memory subsystem) 504. While shown with four ports, network switch 406 may include more or less than ports. Processor 502 controls crossbar switch 510 to route traffic between ports P1-P4. Data storage 504 maintains L2 table 506 and VM interface data 508. MAC addresses and UUIDs of active VMs 414 and a switch ID of physical network switch 406 can be stored in a VM interface data file 508 (i.e., a current configuration file), while port numbers for active VMs 414 can be provided by L2 table 506. Physical network switch 406 (which is also a secure API client) locates a VM interface in a port assignment data inventory 532 (of data storage 530) based on a UUID and a MAC address of a VM. Data storage 530 may be maintained by VMM 412 on physical host 418 and/or by VMM management console 420. For example, data storage 530 may correspond to a hard disk drive (HDD).

Physical network, switch 406 reads port assignment data (from port assignment data inventory 532 via a secure API) of a corresponding physical NIC 420 (by mapping a port group of the VM interface to an associated virtual switch 432, then to a physical NIC 420 that acts as an uplink for virtual switch 432). The port assignment data provides the switch ID and port number, based on received discovery message data. In one or more embodiments, a MAC address appearing on a switch port of physical network switch 406 is deemed verified only if all four parameters (i.e., VM MAC address, VM UUID, switch port, and switch ID) match exactly. As noted above, verifying that all four parameters match exactly advantageously guards against spoofing MAC addresses, duplicate MAC addresses, and reused MAC addresses.

Figure 6:
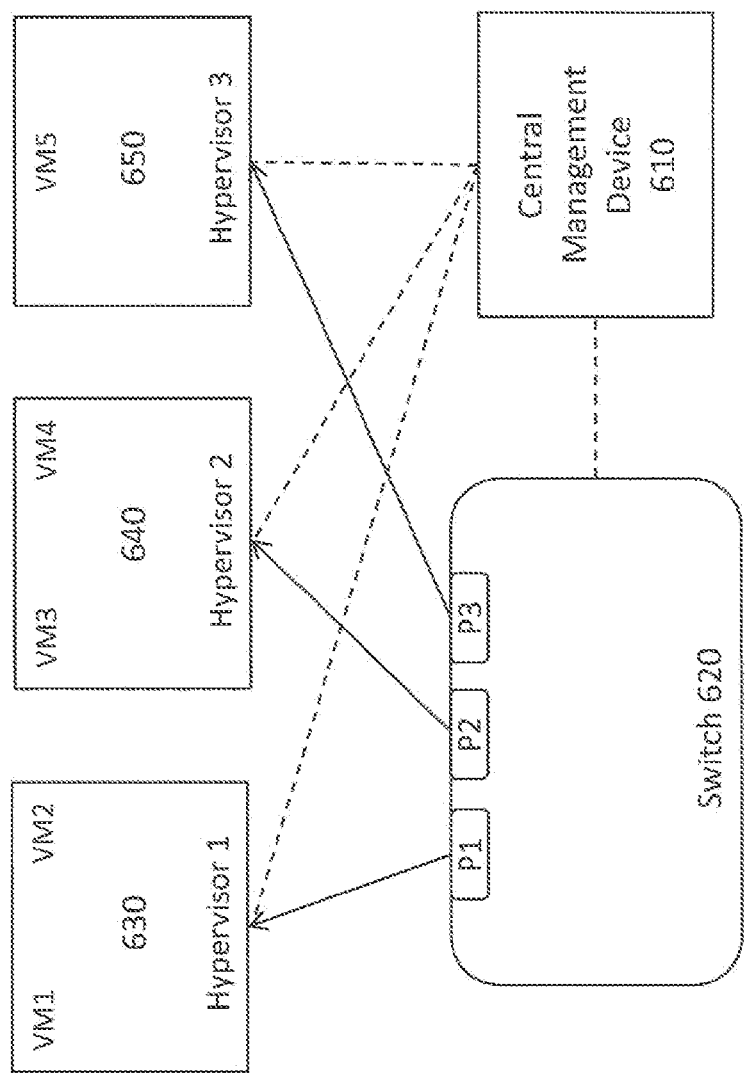
FIG. 6 is a network environment for implementing an embodiment of the disclosure.

FIG. 6 is a network environment for implementing an embodiment of the disclosure. Specifically, FIG. 6 shows central management device 610 communicating with switch 620. Central management device 610 maintains a database of routing tables and node assignments. Switch 620 is shown with exemplary ports P1, P2 and P3. In the embodiment of FIG. 6, ports 1 and 2 are shown has having VMs. P1 communicates with, hypervisor 1, P2 communicates with hypervisor 2 and P3 communicates with hypervisor 3. Each hypervisor can manage one or more VMs. Hypervisor 1 manages VM1 and VM2; hypervisor 2 manages VM3 and VM4; hypervisor 3 manages VM5. The hypervisor can define a VMware hypervisor. In FIG. 6 the solid lines indicate a link between a switch port and a hypervisor. The dotted lines denote IP connectivity between the nodes.

A validation trigger can occur if a message is directed at a VM. Alternatively, routine validation checks can be implemented periodically. A pre-validation step can be used to shorten the validation process. During pre-validation, or in response to an incoming message directed to a VM, the static configuration of the affected (relevant) switch is queried to determine whether the port on which the VM resides is identified at the switch's configuration. If the port is identified in the static configuration, additional validation can be avoided. The pre-validation process can be used as a stand alone process or may be combined with one or more of the following validation techniques.

In one embodiment of the disclosure, a so-called Hello protocol is ran on switch ports P1, P2 and P3. Periodically, each switch port will send a Hello message in an L2 packet on each of its server-feeing ports. The Hello packet contains an identification of the switch (e.g., the Management IP Address) and an identification of the port (e.g., the port number) on which the packet is sent. The Hello protocol may be an especially-devised protocol or a conventional protocol such as CDP or LLDP. In one embodiment, the Hello packets are sent peer-to-peer such that the packets are not forwarded by the switch. This will ensure that the switch port connected to the hypervisor NIC is the source of the Hello packet. The associated hypervisor maintains a database of the information in the received hello packet and the port number on which the Hello packet was received. Each, hypervisor (630,640,650) sends its database to central management device 610. Alternatively, the database on each hypervisor can be queried from Central Management Device 610.

Because of the discovery messages (Hello messages), central management device 610 will contain information about the switch port to which the hypervisors are connected. Switch 626 may comprise a local cache of the database (not shown), or may query a database (not shown) associated with central management device 621) on demand. Switch 621) may query the database to determine if a particular switch port is connected to a VMware hypervisor. A switch port (e.g., P1, P2, P3) connected which is connected to a VMware hypervisor is assumed to be a trusted port.

Figure 7:
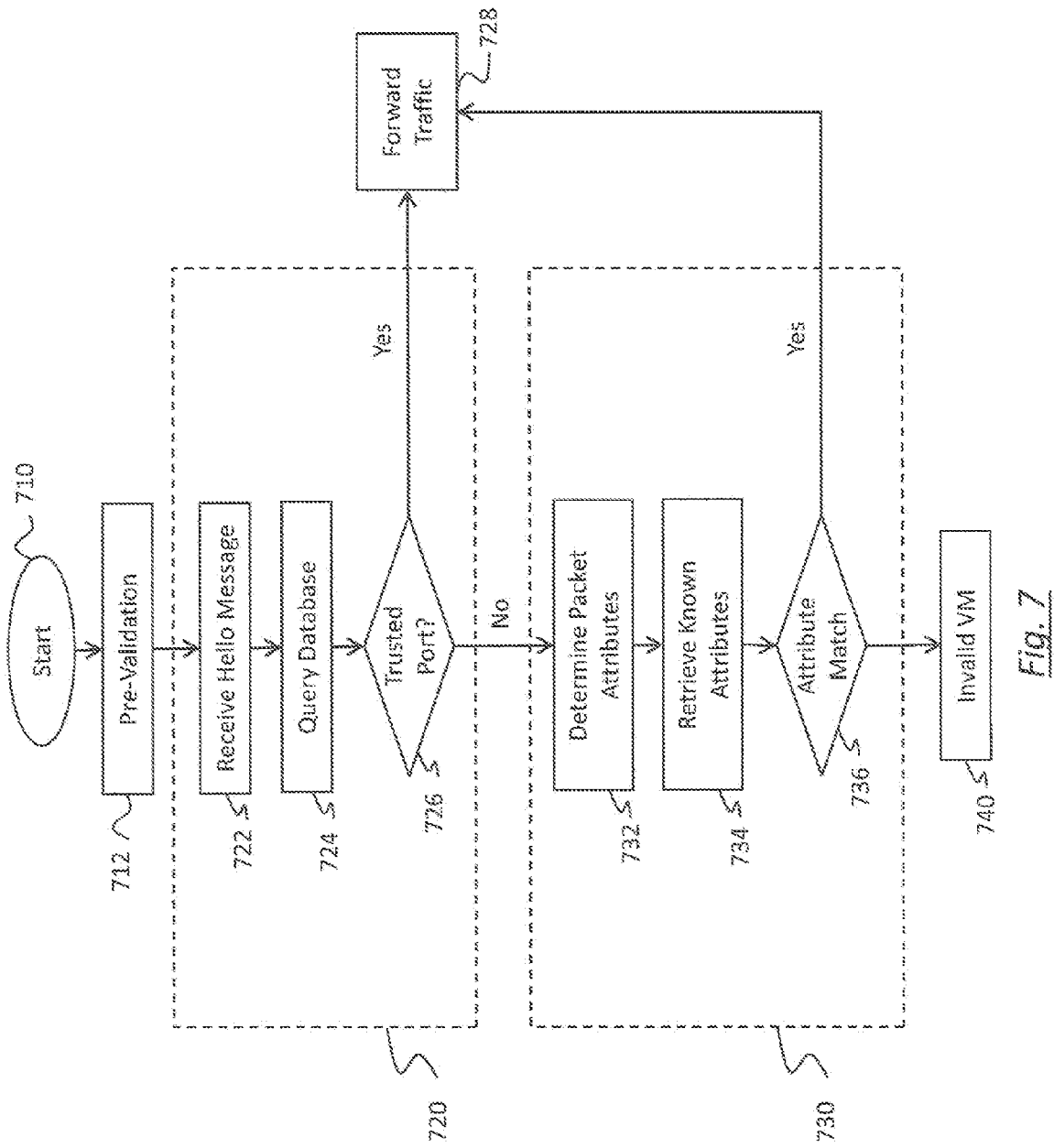
FIG. 7 is a flow-diagram schematically showing an implementation according to an embodiment of the disclosure.

FIG. 7 is a flow-diagram schematically showing an implementation according to one embodiment of the disclosure. Particularly, FIG. 7 shows pre-validation 712 and two independent modes of validation checking: basic validation (interchangeably, verification) 720 and advanced validation 730.

The process of FIG. 7 starts at step 710 when a new VM is discovered or as part of a periodically-scheduled validation command. Switch 630 (FIG. 6) may perform pre-validation and/or validation-when a VM MAC address is detected on a new port. Switch 630 may also perform trusted port checking whenever a link goes up or down. Pre-validation check 710 seeks to efficiently identify authenticity of the newly-discovered VM. Pre-validation starts by querying the static configuration stored on the switch. The static configuration file/table is conventionally stored on the switch and, among others, maintains data directed to ports residing on each switch. If the static configuration identifies the port on which the target VM resides, then the port and the VM are assumed to be trusted and further validation may not be need. On the other hand, the network manager may optionally require additional validations through one or both of validation checks 720 and 730. Once a port or VM is identified as trusted, further validation may not be needed until a communication link is interrupted.

At step 722 the Hello packet is sent to the identified port. At step 724, the switch (e.g., switch 620) will query a database 726 (not shown) to determine whether traffic from the newly-seen VM is arriving from a trusted port (e.g., P1). If the basic validation check 720 is successful, traffic is forwarded to the VM as shown in step 728. If the basic validation check fails, one or more of the user-specified actions will occur. The user-specified actions may include: (1) generating a warning syslog; (2) disabling the port; (3) creating an access control list (ACL) to drop traffic from the suspected MAC; or (4) conduct advance validation check 730.

In advance validation 730, in addition to the port check of step 720, the switch will check for VM MAC duplication and VM MAC reuse. At step 732 the Hello packet's attributes are identified. This information is available from the packet itself.

At step 734, the expected attributes of the Hello packet are retrieved from the database. When the user configures the VM MAC address, the switch will query the database and ensures that the VM MAC is unique and the VM UUID will be retrieved from the database (step 734) and used for VM MAC validation check. The switch will also query the database to determine if traffic from the newly-discovered VM is arriving from a trusted port and whether the following attributes match:

{VM MAC Address, VM UUID, Switch Port, Switch ID}

In one embodiment, the MAC Address appearing on the switch port is deemed verified only if all four attributes match exactly. In another embodiment, one or more attribute must match to validate authenticity. The attribute matching step is shown as step 736. The validation cheeks of FIG. 7 guard against spoofing, duplicate MAC address and reused MAC address. If the attribution match fails, the VM is invalidated at step 740, While the principles of the disclosure have been illustrated in relation to the exemplary embodiments shown herein, the principles of the disclosure are not limited thereto and include any modification, variation or permutation thereof.

What is claimed is:

1. A method for verifying identity of a virtual machine (VM), the method comprising:
    receiving, at a switch associated with a VM group, an initial message from a first VM of the VM group through a port, the first VM managed by a first hypervisor;
    the switch determining, based on configuration information associated with the switch, that the port is not a trusted port, the configuration information indicating that the first hypervisor is not connected to the switch through the port;
    in response to said determining that the port is not a trusted port, the switch:
        retrieving attribute data relating to the initial message from a database;
        determining, based on the attribute data, that the port the initial message arrived through is a trusted port;
        querying the attribute data; and
        ascertaining whether the first VM is valid, wherein said ascertaining is affirmative if the attribute data matches with at least one attribute included in the initial message, and wherein said ascertaining is negative if the attribute data does not match with at least one attribute included in the initial message, the attribute data including at least one of a first VM media access control (MAC) Address, a VM universally unique identifier (UUID), a switch port address or a switch ID.

2. The method of claim 1, wherein the initial message further comprises a switch identifying address and a port identifying address on which the initial message originated.

3. The method of claim 1, wherein the initial message is governed by a proprietary protocol or a link layer discovery protocol (LLDP).

4. The method of claim 1, wherein the initial message is in an L2 packet.

5. The method of claim 1, wherein the database is stored at a central management device or at the first hypervisor.

6. A system for verifying identity of a virtual machine (VM), the system comprising:
    a processor circuit;
    a memory circuit in communication with the processor circuit, the memory circuit storing a program code executable on the processor circuit, the program code configuring the processor circuit to:
        receive an initial message from a first VM of a VM group through a port, the first VM managed by a first hypervisor;
        determine, based on configuration information associated with a switch, that the port is not a trusted port, the configuration information indicating that the first hypervisor is not connected to the switch through the port;
    in response to a determination that the port is not a trusted port:
        retrieve attribute data relating to the initial message from a database;
        query determine, based on the attribute data, that the port the initial message arrived through is a trusted port;
        query the attribute data; and
        ascertain whether the first VM is valid, wherein the first VM is ascertained as valid if the attribute data matches with at least one attribute included in the initial message, and wherein the first VM is ascertained as invalid if the attribute data does not match with at least one attribute included in the initial message, the attribute data including at least one of a first VM media access control (MAC) Address, a VM universally unique identifier (UUID), a switch port address or a switch ID.

7. The system of claim 6, wherein the initial message further comprises a switch identifying address and a port identifying address on which the initial message originated.

8. The system of claim 6, wherein the initial message is governed by a proprietary protocol or a link layer discovery protocol (LLDP).

9. The system of claim 6, wherein the initial message is in an L2 packet.

10. The system of claim 6, wherein the database is stored at a central management device or at the first hypervisor.

11. A non-transitory computer-readable medium comprising instructions configured to cause a switch associated with a virtual machine (VM) group to:
    receive an initial message from a first VM of the VM group through a port, the first VM managed by a first hypervisor;
    determine, based on configuration information associated with the switch, that the port is not a trusted port, the configuration information indicating that the first hypervisor is not connected to the switch through the port;
    in response to a determination that the port is not a trusted port:
        retrieve attribute data relating to the initial message from a database;
        determine, based on the attribute data, that the port the initial message arrived through is a trusted port;
        query the attribute data; and
        ascertain whether the first VM is valid, wherein the first VM is ascertained as valid if the attribute data matches with at least one attribute included in the initial message, and wherein the first VM is ascertained as invalid if the attribute data does not match with at least one attribute included in the initial message, the attribute data including at least one of a first VM media access control (MAC) Address, a VM universally unique identifier (UUID), a switch port address or a switch ID.

12. The non-transitory computer-readable medium of claim 11, wherein the non-transitory medium defines a firmware, a software implemented on a processor circuit, or instructions recorded on a tangible medium.

* * * * *